No. 12,224. REISSUED MAY 24, 1904.
E. H. GOLD.
CAR HEATING SYSTEM.
APPLICATION FILED AUG. 10, 1903.
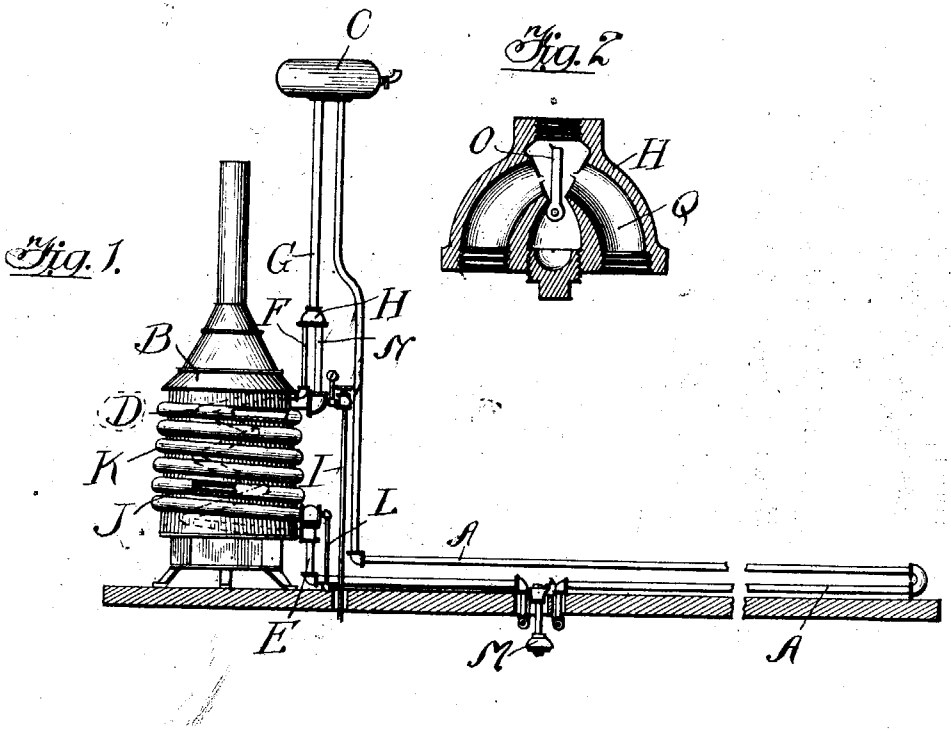
Witnesses
J. B. Weis
W. E. Shields
Inventor
Egbert H. Gold,
By Raymond & Brown
Attys No. 12,224. Reissued May 24, 1904.

UNITED STATES PATENT OFFICE.

EGBERT H. GOLD, OF SHELBY, INDIANA.

CAR-HEATING SYSTEM.

SPECIFICATION forming part of Reissued Letters Patent No. 12,224, dated May 24, 1904.

Original No. 707,964, dated August 26, 1902. Application for reissue filed August 10, 1903. Serial No. 168,880½.

*To all whom it may concern:*

Be it known that I, EGBERT H. GOLD, a citizen of the United States, residing at Shelby, in the county of Lake and State of Indiana, have invented certain new and useful Improvements in Car-Heating Systems, of which the following is a specification.

This invention relates to improvements in that class of car-heating systems in which two different heaters are designed to heat independently or simultaneously the water contained in a single set of circulating-pipes common to both heaters, and has for its primary object to automatically control the direction of the current of water in the circulating-pipes according to which heater is being used, so as to positively insure against the short-circuiting of the set of circulating-pipes through either one of the heaters.

Another object is to have the heaters compact in arrangement, so as to occupy the minimum space in a car without in any wise reducing the efficiency of the system, a most important desideratum in heating systems of this class.

These and such other objects as may hereinafter appear are attained by the devices illustrated in the accompanying drawings, in which—

Figure 1 is an elevation of the preferred form of heating system embodying my invention. Fig. 2 is a detailed section through the preferred form of current-controlling valve thereof.

Like letters of reference indicate the same parts in both figures of the drawings.

I may here state that in a general way there is nothing novel in heating systems to which my invention is particularly applicable, apparatuses of various kinds being now quite common in the art for heating the circulating-pipes of the water-heating systems for railway-cars by two separate heaters arranged to heat the water either independently of each other or simultaneously, and my invention is applicable to all such heating systems. I am also aware that it has been proposed to interpose in such systems current-directing devices intended to accomplish the object of my invention; but so far as I am aware none of such devices have ever proven practically or commercially satisfactory, because they are current-directing devices and not current-controlling devices and do not interpose insurmountable obstruction to the deflection of the current in the water-circulating pipes, but simply tend to directing such current without exercising control thereof.

Referring now by letter to the accompanying drawings, A indicates the water-circulating pipes of an ordinary heating system, B an ordinary Baker heater, and C the usual elevated tank designed to give pressure in the circulating-pipes, the hot water from the heater rising first to the tank and then flowing out through the circulating-pipes in the usual manner.

In the preferred embodiment of my invention I arrange a coil D (shown by dotted lines in the drawings) within the fire-box of the Baker heater, such coil having open and direct communication with the return-pipe E of the water-circulating system, entering the heater at the bottom and leaving the same at the top, where it connects by pipe F with a riser G, leading to the elevated tank C, my current-controlling valve H being preferably interposed between the pipe F and the riser G, as clearly shown in Fig. 1 of the drawings. The coil D may be called the "primary heater," being intended to be directly heated by the fire in the heater B, to which it is exposed, provided the necessity arises for building a fire within the heater. The secondary heater, which is independent of the primary heater, is, as usual, a steam-heater, and consists of a heating device obtaining its source of heat direct from the boiler of the locomotive through an open pipe leading back underneath the cars. In the preferred embodiment of my invention the steam is conducted from the train-pipe (not shown in Fig. 1) through a branch pipe I to the upper end of a coil J, which passes through a water-coil K, wound around the heater B. The other end of the steam-coil is connected by pipe L with a steam-trap M or other suitable exhaust device, as usual in this class of apparatuses. The water-coil K, through which the steam-coil J passes, has open communication at one end with the return-pipe E of the circulating system and at the other end is connected by pipe N with the riser G, leading to the elevated tank C, the controlling-valve H being also interposed between the pipe N and the riser G, as clearly shown in Fig. 1. It will thus be seen that the water in the circulating system A may be heated and circulated by a fire in the heater B only whenever it is desirable to build a fire in the heater—as, for instance, when all of the cars of a train are not equipped with steam-heating apparatus or such apparatus is out of order—or the water may be heated by the steam-heater J alone where the heat so applied is sufficient for all purposes. On the other hand, it is equally obvious that the water in the circulating system may be heated simultaneously by both the fire in the heater B and steam in the heater J. In order to operate either of the heaters independently, so as to sufficiently heat the water in the circulating-pipes, or even simultaneously, it is essential that the current of water in the circulating-pipes shall not only be directed properly, but positively controlled in its flow, for in the absence of such control—as, for instance, if the pipes F and N had open and uncontrollable communication with each other and with the pipe G—if the heater B were being used alone the water would rise from the coil D into the pipe F and from thence back through the pipe N, through the coil J and the coupling of the pipe E, back to the lower end of the coil D, thus short-circuiting the circulating-pipes A, for there would be no inducement for the water to rise and overcome the resistance in the pipe G. Exactly the reverse of these conditions would take place if the steam-heater J were alone employed; but the result of short circuit would be the same. Now to overcome this difficulty I provide a current-control valve located in the casting H at the conjunction of the pipes G and N, the control-valve proper being a flipper-valve O, pivoted in the case and adapted and arranged to seat upon either the branch P in the casing H, with which the pipe F is connected, or the branch Q, with which the pipe N is connected, according to whether the heater B or J is being used, or to occupy the mid-position (shown in Fig. 2) when both systems are being used. Thus if the heater B is being used and the water is rising through pipe F it will strike the valve O and force it over to its seat upon the branch Q, efficiently closing that branch against the possibility of the water escaping therethrough, and hence compelling the rise of the water through the pipe G and tank C on its passage through the circulating system. On the other hand, if the heater J is being used the water will rise in the pipe N and passing up through the branch Q will force the valve O over to its seat upon the branch P, and thus effectively close that branch of the passage of the water, but leave the passage of the pipe G free. It will thus be seen that no matter which heater is being used the controlling-valve will positively and absolutely control the direction of the current of water through the circulating system and likewise prevent with certainty the possibility of short-circuiting the circulating system through the heater not in use. As is commonly known, the circulation in these heating systems is apt to be quite sluggish, because of the great amount of friction between the current and the pipes. It therefore is an object to avoid imposing an additional load on the current or to increase the friction in any other manner. It will be observed that by means of my device as described the weight of the current-controlling valve when at rest is at all times supported by a part of the structure. As shown in Fig. 2, when in either of its closed positions the valve is supported by its pivot and by the valve-seat upon which it rests, while the current passes freely over it without having any load imposed thereon beyond the initial work of throwing the valve over from one seat to the other. When in its mid-position, the weight of the valve is supported on its pivot, while the opposing currents, rising through the pipes Q and P, acting upon opposite faces of the valve, serve to keep it in equilibrium without either of said currents having to support the valve in open position. I have found in practice that by means of this construction I am enabled not only to prevent short-circuiting, but at the same time maintain a rapid circulation for systems of this sort.

While I have shown and described the preferred form of my device, the essential idea of my invention may be utilized wherever there is such a junction between the two heaters and the circulating system of the car that a current passing through the circulating system and one of said heaters will tend to move a valve located within said junction to close a pipe leading from said junction to the other of said heaters, while when both heaters are in operation the current passing therethrough and through the circulating system will hold such valve in a mid-position between ports communicating with both of said heaters.

It is obvious that my invention is applicable to any heating system in which there are two independent heaters for heating a common circulating system, and obviously various modifications and changes may be made in the construction and arrangement of the various devices comprising the heating system without departing from the spirit of my invention so long as they embody the broad idea of my invention—to wit, a current-control valve located at the junction of pipes leading from each of said heaters, with a third pipe leading to the circulating system of the car adapted and arranged to automatically and positively control the direction of the current in the water-circulating system according to which heater is being used and to prevent short-circuiting of the circulating system whenever either one of the heaters is out of use.

I claim—

1. In a car-heating system, the combination with two independent heaters and a circulating system in operative contact with both of said heaters and adapted to be separately or simultaneously heated thereby, of a current-controlling valve interposed at a common junction between said heaters and said circulating system adapted to be closed against the inlet from either of said heaters to said junction whenever the other heater is in operation, and to be moved to a mid-position between the inlets to said junction from each of said heaters when both of said heaters are in operation and to be supported when in said closed positions and when in said mid-position by a part of the structure, substantially as decribed.

2. In a car-heating system, the combination with a circulating system, of two independent heaters each of which forms a part of the circulating system, a current-controlling valve located at the common point of junction between said heaters and the circulating system, and adapted to be automatically operated by the current moving from either or both of said heaters into the circulating system, to prevent short-circuiting, said valve when at rest being wholly supported by a portion of the structure, substantially as described.

3. In a car-heating system, the combination with two independent heaters, of a pipe connected to each of said heaters and to a casing, valve-seats formed on the upper end of each pipe, a single pipe connected to said casing communicating with said heater-pipes through the casing, and a flipper-valve pivoted in the casing below said valve-seats and adapted to be seated on one of said seats on one pipe when the current in the other pipe is rising, and adapted to engage the other seat on the other pipe when the current is rising in the first-named pipe, and adapted to assume a vertical position when the current is rising in both pipes simultaneously, substantially as described.

4. In a car-heating system, the combination with two independent heaters, of a pipe connected to each of said heaters, a casing connected to the upper ends of each of said pipes and communicating therewith, a single pipe connected to said casing at an intermediate point above said heater-pipes and communicating therewith through the casing, valve-seats formed on the upper ends of said heater-pipes, a flipper-valve pivotally mounted in said casing below the valve-seats, adapted to be seated on one of said seats when the current in the other pipe is rising, and adapted to engage the other seat when the current is rising in the first-named pipe, and adapted to assume a vertical position when the current is rising in both pipes simultaneously, whereby its weight is borne by the pivotal connection and its vertical position maintained by the equalization of the current-pressure in each side thereof, substantially as described.

5. In a car-heating system, the combination of two heaters mounted in parallel in said system, and adapted to be operated alternately or in unison, an elevated expansion-tank, means interposed in said system for providing communication between said heaters and said expansion-tank, said means including a branch riser leading from each of said heaters, and automatically-operating means, interposed in said system between said heaters and said expansion-tank, arranged to permit the circulation of water from the active heater through the circulating system, while at the same time preventing the establishment of a local circuit from the active heater to the inactive heater whenever either one of said heaters alone is in operation.

EGBERT H. GOLD.

Witnesses:
M. E. SHIELDS,
G. Y. DANKWARD.